July 19, 1949.　　　　　F. GRIMM　　　　　2,476,366
HEIGHT ADJUSTING DEVICE
Filed July 17, 1945
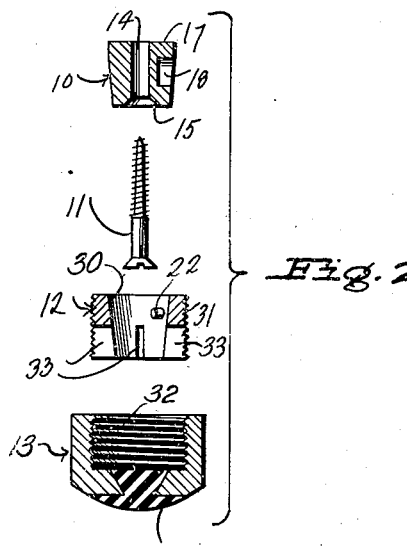
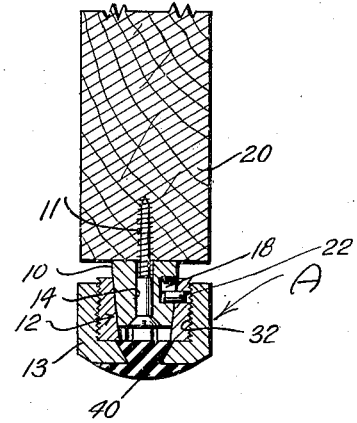
Fig. 1.
Fig. 2.
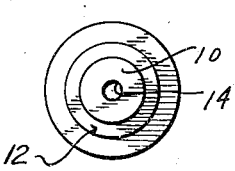
Fig. 3.
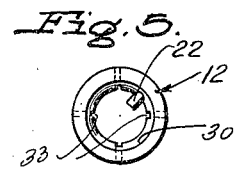
Fig. 5.
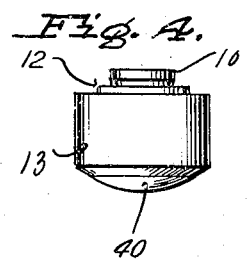
Fig. 4.
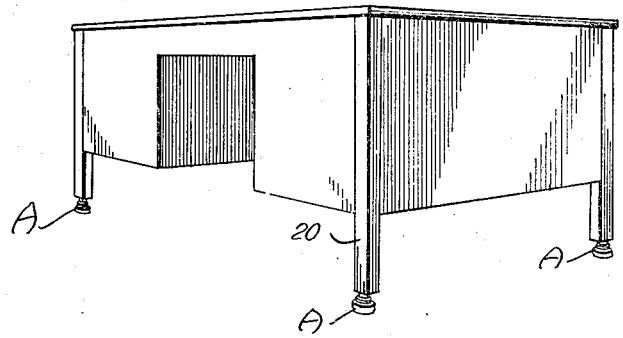
Fig. 6.
INVENTOR.
Frederick Grimm.
BY Lancaster, Allwine Rommel
ATTORNEYS.

Patented July 19, 1949

2,476,366

UNITED STATES PATENT OFFICE 2,476,366

HEIGHT ADJUSTING DEVICE

Frederick Grimm, Berwyn, Md., assignor, by mesne assignments, to Levelor Corporation, a corporation of New York Application July 17, 1945, Serial No. 605,601

9 Claims. (Cl. 45—139)

1

This invention relates to improvements in devices of an adjustable character for leveling articles and/or adjusting the height thereof.

The primary object of this invention is the provision of an extremely practical, simple, and economical device for leveling articles of furniture, etc.

A further object of this invention is the provision of an improved leveling device of the above mentioned character which has an adjustment locking feature which is self-operating.

A further object of this invention is the provision of an improved means for locking two screw threaded members into a desired relative adjustment.

Other objects and advantages of the invention will be apparent from the following detailed description.

In the accompanying drawing, forming a part of this specification, and wherein similar reference characters designate corresponding parts thruout the several views, Figure 1 is a fragmentary vertical section taken thru the leg of some article, such as an article of furniture having the improved leveling device secured therewith.

Figure 2 is an exploded view showing the various details of the improved device.

Figure 3 is a plan view of the improved device without the attaching screw.

Figure 4 is a side elevation of the improved leveling device.

Figure 5 is a top plan view of a screw threaded adjustment locking sleeve associated as a part of the device.

Figure 6 is a perspective view of a desk showing the improved leveling devices associated with the desk legs thereof.

In the accompanying drawing, wherein for the purpose of illustration is shown only a preferred embodiment of the invention, the letter A may generally designate the improved device which may be used as a leveling device (its primary purpose) or as a height adjusting device, to adjust the height of any desired article, such as a desk, article of furniture, machinery, etc.

The improved leveling device consists of a base or attaching piece 10, in the form of a sleeve-like plug, and screw 11 for its connection with the article to be height adjusted or leveled; a screw threaded split sleeve or bushing 12 and a tread member 13.

The parts 10, 12 and 13 may be made of any approved material desired. Preferably they are made of plastic or some synthetic resin, altho they can be constructed of metal or any desired material.

The base member 10 is of frusto-conical shape having a passageway 14 therethru for receiving the screw 11. The lower end of this base member 10 is countersunk at 15 to receive the countersunk head of the screw 11 so that the outer surface of the head of the screw lies flush with the bottom surface of the piece 10 when the latter is attached to a support 20, such as a table leg. The outer surface of the piece 10 tapers downwardly convergent from the top surface 17 and it is provided with an elongated slot 18 inwardly from the outer surface thereof for receiving a pin 22 in sliding relation therein; the pin being provided for the purpose of adjustably securing the split sleeve 12 upon the base piece 10.

The sleeve 12 has a tapered passageway 30 therethru adapted to receive the piece 10 in interfitting relation therewith. The outer diameter of the sleeve is uniform thruout the height of the sleeve except that it is screw threaded at 31 for screw threading within the screw threaded passageway 32 of the tread 13, as will be subsequently mentioned.

The sleeve 12 is vertically provided with slits 33 upwardly from the bottom surface thereof and thru the thickness thereof; the same and height extending about one-half the height of the sleeve. They are provided for the purpose of expanding the sleeve at its lower portion in order to lock the tread thereon at a desired adjustment; the expansion being taken care of by a movement of the sleeve 12 upwardly upon the tapered base piece 10.

The pin 22 is permanently secured upon the split sleeve 12 on the internal surface thereof projecting into the passageway 30 at a location above the ends of the slits 33. Its projection into the slot 18 of the base piece 10 permits adjustability of the sleeve 12 longitudinally upon the attaching post 10, as will be readily apparent from Figure 1 of the drawing.

The tread 13 is in the nature of an inverted cap nut and it has a screw threaded passageway 32 therein for adjustment upon the screw threads 31 of the sleeve 12. The bottom of the tread is closed and, if desired, it may be provided with a rubber or metal insert 40, depending upon the use and nature and purpose of the device.

It will, of course, be apparent that the tread 13 is detachable from the sleeve 12. However, the pin 22 holds the base 10 and sleeve 12 assembled.

Used either as a leveling device or height adjusting device, the tread 13 is adjusted upon the sleeve 12 to the desired location and of course the weight of the article to be leveled or supported will force the attaching post 10 into the tapered socket 13 for the purpose of laterally expanding the lower slotted portion of the sleeve into binding engagement with the screw threads of the tapered sleeve and thus the screw threaded adjustment of the sleeve 12 and tread 13 is secured. In order to insure this locking action the taper of the socket 30 may be slightly steeper than the taper of the post 10.

The facility with which the device may be attached to a leg or support 20 is obvious. The screw threaded member 11 secures the post in position with the cap or tread 13 removed and, of course, the tread 13 is then adjusted to the desired position upon the sleeve and when the weight of the article to be leveled or height adjusted rests upon the device the post will expand the sleeve into engagement with the tread and lock the adjustment.

To readjust all that is necessary is to take the weight off of the device, pull down the tread and this will also pull the sleeve down relative to the post 10. The adjustment is thus "unlocked" and the tread may be adjusted upon the sleeve.

It is apparent that the locking expedient is an improved feature, and with respect to this and other features various changes may be made in the shape, size and arrangement of parts without departing from the spirit of the invention or scope of the claims.

I claim:

1. In a leveling and/or height adjusting device the combinaton of a tapered attaching member, an externally screw threaded sleeve having a tapered socket for receiving the attaching member, said sleeve being laterally slotted to insure its expansion when the sleeve and attaching member are moved in interfitting relation, and an internally screw threaded tread screw threaded upon said sleeve and locked in adjustment thereon through expansion of the sleeve by said attaching member.

2. In a leveling device an externally tapered attaching piece, an externally screw threaded member having a tapered socket for slidably receiving the tapered attaching piece, means to secure the attaching piece and externally screw threaded member together to permit relative longitudinal adjustment between the same, said member at its lower end being slotted thru the thickness thereof, and an internally screw threaded tread cap adjustably threaded upon said member.

3. In a device of the class described the combination of a frusto-conical attaching post, means for attaching said post to the leg of an article to be adjusted or leveled, said post being tapered divergently from the top thereof downwardly, a split externally screw threaded sleeve having a tapered passageway conforming substantially to and receiving the attaching post, and an internally screw threaded tread member for adjustment upon said externally threaded split sleeve.

4. In a device of the class described the combination of a frusto-conical attaching post, means for attaching said post to the leg of an article to be adjusted or leveled, said post being tapered divergently from the top thereof downwardly, a split externally screw threaded sleeve having a tapered passageway conforming substantially to and receiving the attaching post, and an internally screw threaded tread member for adjustment upon said externally threaded split sleeve, said post having a longitudinal slot externally therein, and a pin carried by said sleeve projecting into said slot to limit the relative movement of the sleeve upon said post.

5. In a leveling device the combination of a threaded member, means for attaching said member to an article to be leveled, a floor engaging tread member threaded upon the threads of the first member, and means for radially expanding the first member upon said floor engaging member to lock the threads of said members and hold said members in a desired leveling adjustment.

6. In a leveling device the combination of a threaded member which has a slot extending in intersecting relation transversely across said threads, means for attaching said member to an article to be leveled, a floor engaging tread member threaded upon the threads of the first member, and means for radially expanding the first member upon said floor engaging tread member to lock the threads of said members together and hold said members in a desired leveling adjustment.

7. In a leveling device the combination of a threaded synthetic resin member externally screw threaded and provided with a split through said threads whereby said member may be laterally expanded, means for attaching said member to an article to be leveled, a floor engaging tread member threaded upon the threads of said first mentioned member, and likewise formed of synthetic resin, and means for radially expanding the first member in releasable relation upon said floor engaging member to lock the threads of said members together and hold them in a desired leveling adjustment.

8. In a leveling device the combination of a base piece, means for attaching the base piece to a support or other object, an externally screw threaded radially expansible sleeve having a socket for receiving the base piece for axial movement therealong, the internal socket walls and the base piece externally thereof being so constructed and arranged as to radially expand the sleeve upon axial movement of it upon the base piece in one direction, and an internally screw threaded supporting member screw threaded upon said sleeve and adapted to be locked thereon upon radial expansion of the sleeve as aforesaid.

9. In a device for leveling articles the combination of a sleeve-like plug, attaching means carried by said plug to secure the plug to the article to be leveled, a split bushing annularly mounted upon the plug for longitudinal movement axially of the plug, means to prevent relative rotation of the bushing upon the plug, said bushing being externally screw threaded, an internally threaded tread cap adjustably mounted upon the threads of the bushing, and means upon said plug socketed within the split bushing for laterally expanding the bushing into thread locked engagement within said cap upon relative axial movement of the plug and bushing.

FREDERICK GRIMM.

REFERENCES CITED

The following references are of record in the file of this patent:

UNITED STATES PATENTS

| Number | Name | Date |
|---|---|---|
| 997,842 | Metzroth | July 11, 1911 |
| 1,229,831 | VonDerLin | June 12, 1917 |
| 1,289,473 | Keating | Dec. 31, 1918 |
| 1,707,363 | Opremchak | Apr. 2, 1929 |
| 1,898,465 | Peters | Feb. 21, 1933 |
| 1,996,331 | Green | Apr. 2, 1935 |
| 2,272,848 | Miller | Feb. 10, 1942 |

FOREIGN PATENTS

| Number | Country | Date |
|---|---|---|
| 497,079 | France | Mar. 5, 1937 |